(12) United States Patent
Gardner

(10) Patent No.: US 6,476,823 B1
(45) Date of Patent: Nov. 5, 2002

(54) INTERACTIVE IMAGE TILER

(75) Inventor: Timothy Elliott Gardner, Bronx, NY (US)

(73) Assignee: CodeHorse, Inc., Bronxville, NY (US)

( * ) Notice: Subject to any disclaimer, the term of this patent is extended or adjusted under 35 U.S.C. 154(b) by 0 days.

(21) Appl. No.: 09/557,350

(22) Filed: Apr. 25, 2000

(51) Int. Cl.$^7$ ................................................ G09G 5/00
(52) U.S. Cl. ...................................... 345/661; 345/418
(58) Field of Search ................................ 345/661, 764, 345/781, 810, 835, 840, 856, 784, 786, 761, 1.3

(56) References Cited

U.S. PATENT DOCUMENTS

| | | | | |
|---|---|---|---|---|
| 5,687,331 A | * | 11/1997 | Volk et al. | 345/823 |
| 6,346,951 B1 | * | 2/2002 | Mastronardi | 345/716 |
| 6,396,500 B1 | * | 5/2002 | Qureshi et al. | 345/418 |
| 6,400,340 B1 | * | 6/2002 | Nishida | 345/1.1 |

* cited by examiner

*Primary Examiner*—Michael Razavi
*Assistant Examiner*—Mike Rahmjoo

(57) ABSTRACT

In this method for viewing multiple images (or movies), the images can be thought of as being piled up and a grid of tiles is placed on top. Each tile functions like a window onto one of the images. One or more view screens are placed over some of the tiles, and one or more input devices are provided. Cursors are moved around the view screens and over the tiles. When a cursor remains within the borders of one of the tiles for longer than a predetermined amount of time, the image displayed in the tile changes. Should the user click the tile, a "spreading" process is initiated whereby the number of tiles displaying the image clicked on begins to increase. Pressing a keyboard button causes the same spreading to be initiated beneath the cursor but with the image associated with that button rather than the one in the tile beneath the cursor. When the images are drawn onto the tiles, a function is used on a per image basis which maps either each point of the display space or each point of every view screen to a point of the images. Thus when a view screen is allowed to scroll over the display space, an image might or might not scroll with it, depending on whether the associated function maps from the display space or from the view screen. With appropriate images, the view screens can be allowed to wrap around the display space when they are scrolled beyond the display space borders.

6 Claims, 5 Drawing Sheets

Components

1.1
Display Space: 120 x 30

Top Left (0, 0)
36 tiles: each 10 x 10
Bottom Right (120, 30)

1.2
View screen: 40 x 30

1.3
Image A: 40 x 30
f = (x, y) : x = x mod 40; y = y

1.4
Image B: 60 x 30
f = (x, y) : x = x mod 60; y = y

1.5
Image C: 120 x 30
f = (x, y) : x = x; y = y

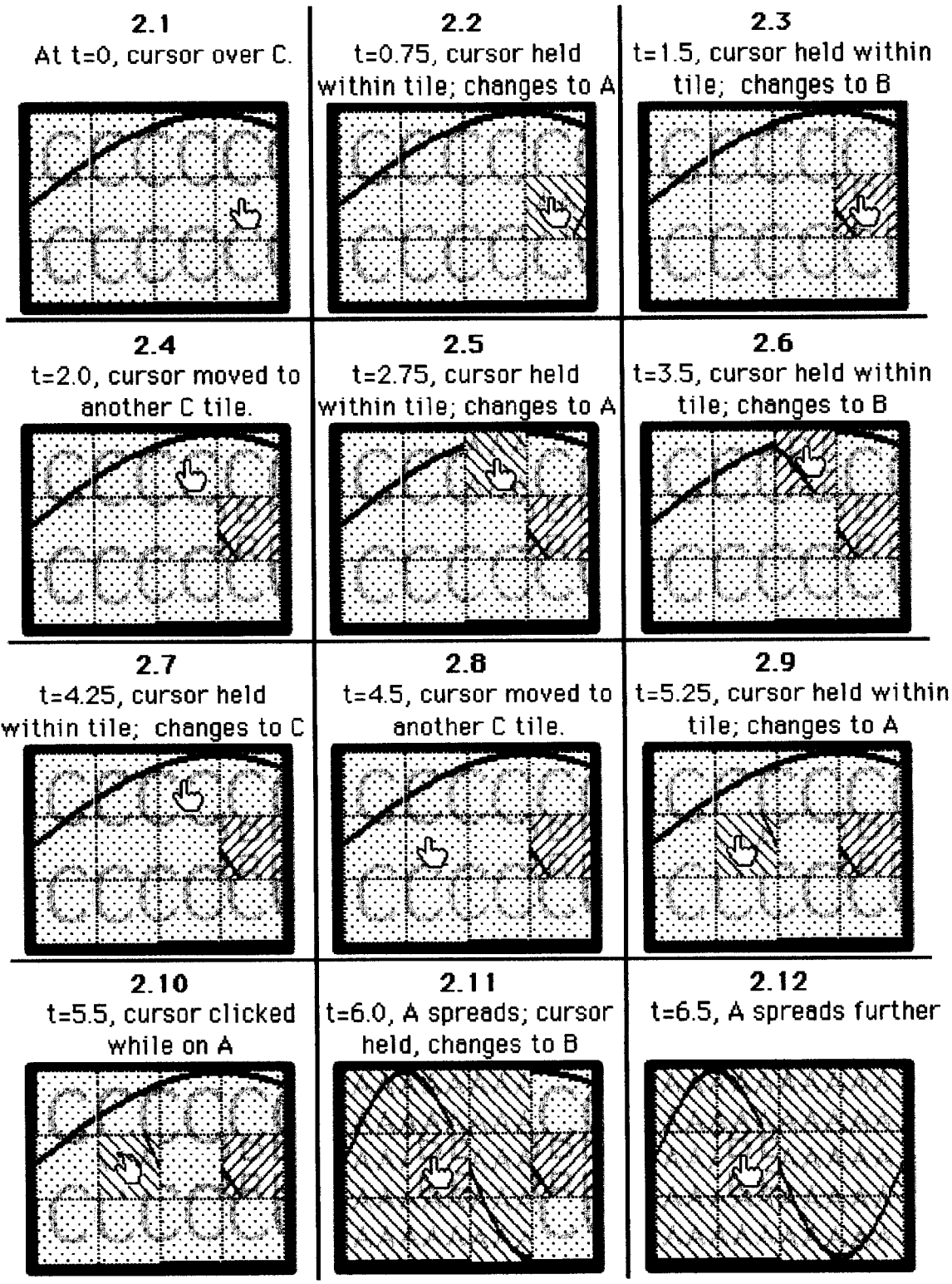

FIGURE 3 – Multiple Viewers  page 1 of 3

| Left View Screen<br>TL (20, 0) – BR (100, 30) | Right View Screen<br>TL (80, 0) – BR (120, 30) |
|---|---|
| 3.1 At t=0, image is C on left view screen. | Image is also C on right view screen. |

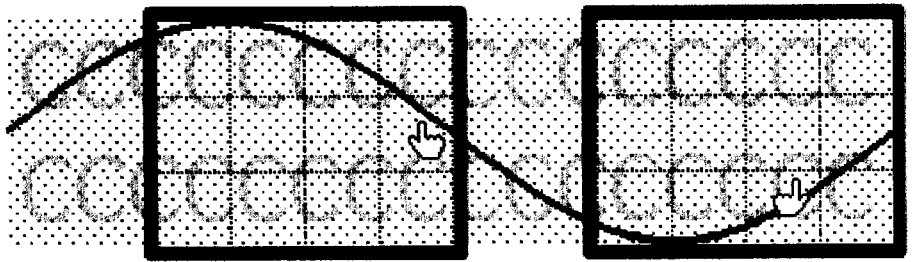

| | |
|---|---|
| 3.2 t=0.75, cursor held over tile, changes to A. | Cursor held over tile, changes to A. |

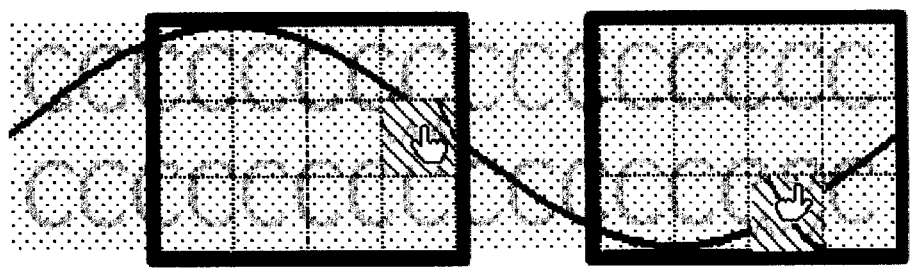

| | |
|---|---|
| 3.3 t=1.25, cursor clicked on A; no immediate change | Cursor held over tile, no change. |

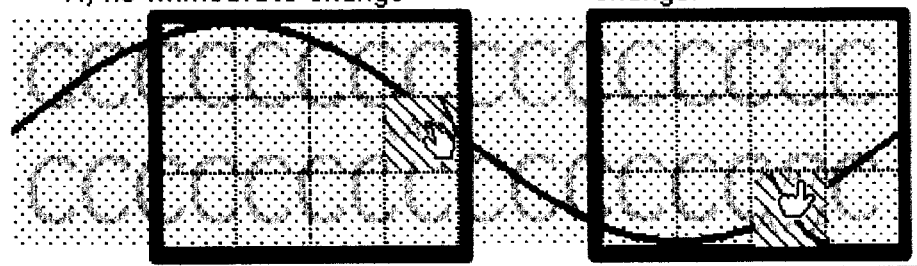

| | |
|---|---|
| 3.4 t=1.5, cursor held within tile; changes to B | Cursor held within tile; changes to B |

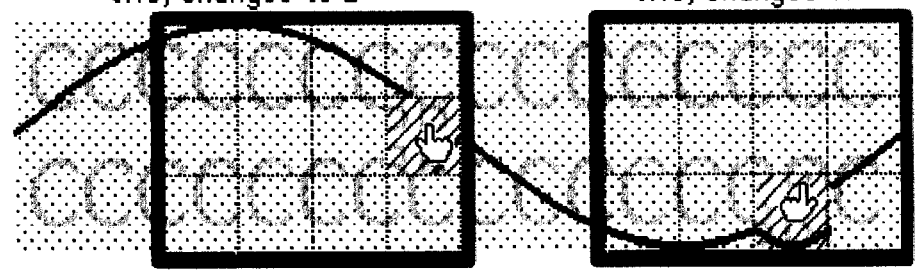

FIGURE 3 – Multiple Viewers     page 2 of 3
| Left View Screen<br>TL (20, 0) – BR (100, 30) | Right View Screen<br>TL (80, 0) – BR (120, 30) |
|---|---|
| 3.5 At t=1.75, A spreads out | Click on B. |
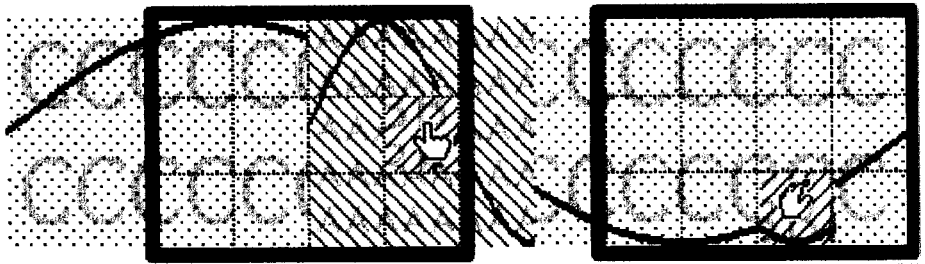
| | |
|---|---|
| 3.6 t=2.25, A spreads; cursor held over tile, change to C | B spreads; Cursor held over tile, changes to C. |
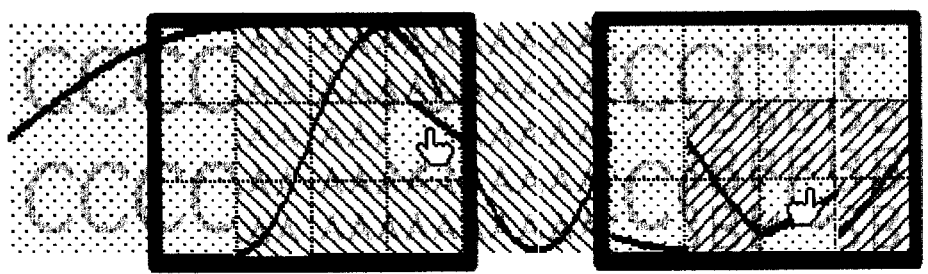
| | |
|---|---|
| 3.7 t=2.75, A spreads further, but blocked by B. | B spreads further, blocking A's spread. |
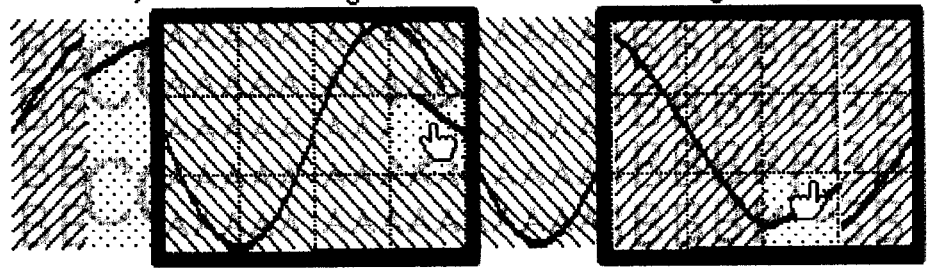
| | |
|---|---|
| 3.8 t=3.0, cursor held within tile; changes to A | Cursor held within tile; changes to A |
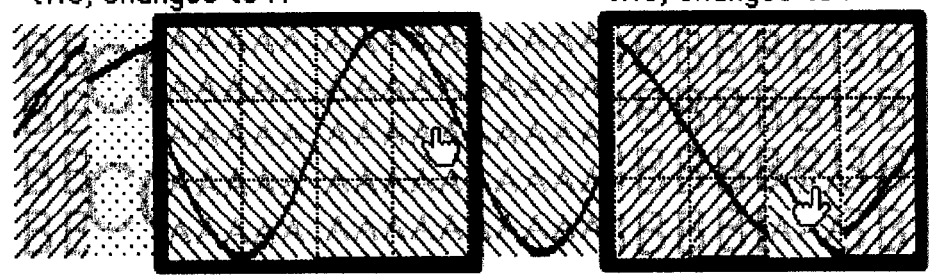

FIGURE 3 – Multiple Viewers — page 3 of 3

| | Left View Screen<br>TL (20, 0) – BR (100, 30) | Right View Screen<br>TL (80, 0) – BR (120, 30) |
|---|---|---|
| 3.9 | t=3.25, A's spread is stopped by B's spread. | B's spread ends A's spread. |
| | 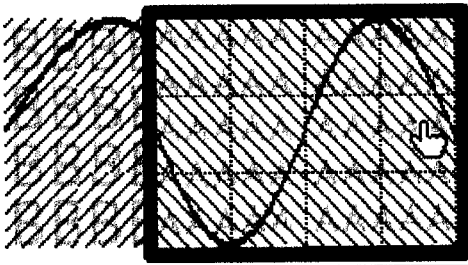 | 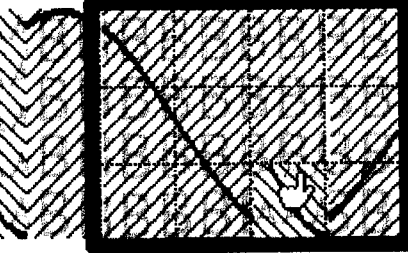 |
| 3.10 | t=3.75, cursor held within tile; changes to B | B spreads further; cursor held within tile, changes to B |
| | 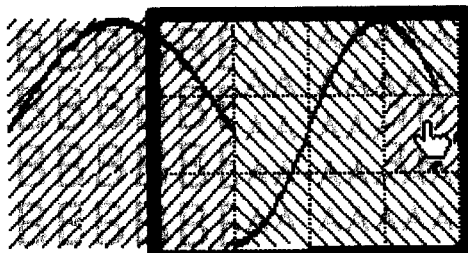 | 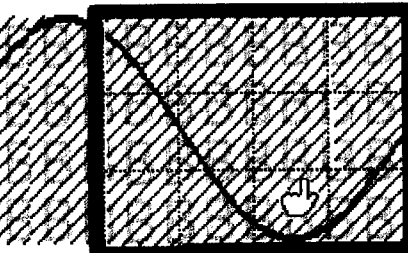 |
| 3.11 | t=4.25, B spreads in from other operator. | B spreads all the way to other view screen |
| | 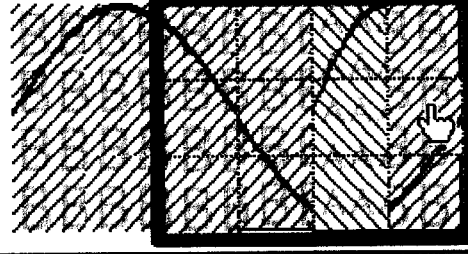 | 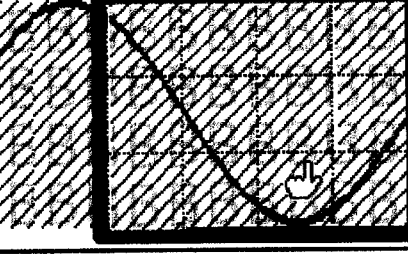 |
| 3.12 | t=4.5, no change because tile under cursor is new. | cursor held within tile, changes to C |
| | 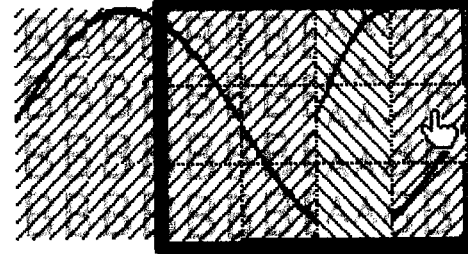 | 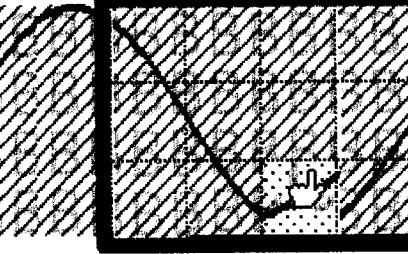 |

INTERACTIVE IMAGE TILER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Interactive displays are increasingly used in a wide variety of public places from museums to corporate lobbies. As display size and quality increases, they have begun to attract the attention of graphic artists as well as information engineers, and recent experimental visual artists routinely incorporate computers into installations and exhibits. Stacks of video displays at trade shows and in public lobbies compete for potential customers' attention, and the most crowded booths are often those with the most visually interesting and interactive displays.

The first public use of this invention is expected to be a on a CD-ROM and in a museum exhibition featuring the work of a leading visual artist.

BRIEF SUMMARY OF INVENTION

An "Interactive Image Tiler" is a method for viewing multiple images which are can be thought of as being piled up in a display space. One or more view screens each display some subset of the display space and hence some subset of the images. Associated with each image is a mapping function which either maps each point of a two dimensional display space or each point in every display screen to a point in the image.

A grid is placed over the display space, and each tile in the grid becomes a window onto one of the images, as the points within that tile are filled with the results of the mapping function for that image. As the user moves holds the cursor over the view screen and hence over one of the tiles, the images are cycled under the tile at a slow but steady rate as long as the cursor remains over that tile. If the cursor is then moved away from the tile, the tile remains as a window onto the selected image. In this way a view screen can be turned into mosaic of tiles showing different images.

Clicking on a tile starts a spreading process in which the tiles near or adjoining the clicked tile tend to adopt the image of the clicked tile, in some measure expanding the window onto the underlying image. With each iteration the window becomes bigger until eventually, left unchecked, the image might take over the entire display space. As an alternative to clicking, the operator can press a button (keyboard key) which causes the tile under the cursor to immediately jump to the image linked to that button/key and then begin the same spreading process which would have taken place had the operator clicked on that tile with the new image. After having clicked on one tile, the operator can then move the cursor and click or key on another, starting another expansion which then competes with the first for display space real estate.

There are no restrictions on the nature of the images displayed. They can be movies and can be in motion provided their associated functions can map each point in the display space or each point on every view screen to a point in the image at all times. The images can contain buttons or other interactive elements and can react to rollovers which are too short in duration to cause any cycling.

In group settings such as a museum, multiple operators share the same underlying display space, but each operator has a separate input device. This allows an operator to click on a tile to initiate a spreading process which then interacts with spreading processes initiated by other operators.

BRIEF DESCRIPTION OF THE DRAWINGS

FIG. 2 shows the operation of an Interactive Image Tiler using the components of FIG. 1 with a single view screen.

FIG. 3 shows the operation of an Interactive Image Tiler using the components of FIG. 1 but with dual view screens.

DETAILED DESCRIPTION OF THE INVENTION

Components

Figure 1:
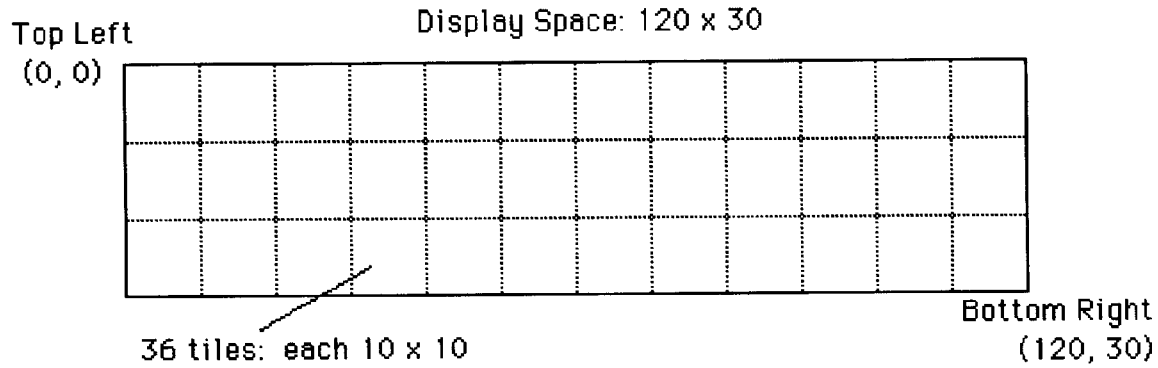
FIG. 1 shows the components used by an Interactive Image Tiler.
Figure 1:
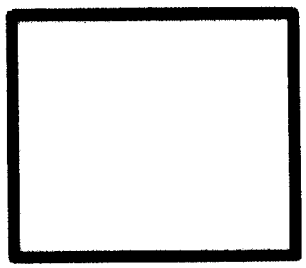
Figure 1:
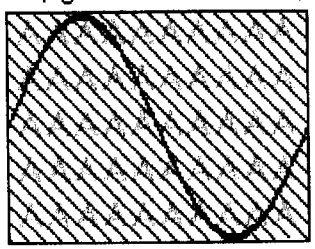
Figure 1:
Figure 1:

FIG. 1 shows example components which illustrate the concepts necessary to understand FIGS. 2 and 3. The display space used here is 120×30 (FIG. 1.1) which is bigger than image A (FIG. 1.3) and image B (FIG. 1.4). However, all the points of the display space can be mapped to a point of image A by the function $f=(x, y): x = x \mod 40; y=y$. This is equivalent to having an A image of the same size as the display space made by placing three copies of A side by side. Likewise image B can be thought of as repeating itself twice in the display space. The mapping of image C (FIG. 1.5) to the display space is one to one. A grid of 36 tiles is placed over the display space (FIG. 1.1). A sample view screen is shown as 40×30 (FIG. 1.2), but any shape which can be contained in the display space would work as well.

Operation—Single View Screen

In FIG. 2, the view screen (FIG. 1.2) is positioned at the far left of the display space. The images are overlayed in the given order A, B, C, with image C being on top for all tiles in FIG. 2.1. FIGS. 2.1 to 2.12 show the view screen as the user holds the cursor in place, moves it, holds it again, moves it further, and then clicks. In FIG. 2.1, the cursor has just arrived on the fourth tile of the second row. Three quarters of a second later, in FIG. 2.2, the tile below the cursor becomes a window onto image A, assuming a cycling order of A, B, C, and back to A. The cursor remains over this tile for another three quarters of a second, causing the tile to cycle to image B in FIG. 2.3.

The cursor is now moved to the third tile of the first row in FIG. 2.4, thus locking the fourth tile in the second row to image B. Note that tiles are only affected when the cursor stays within them for longer than three quarters of a second. Unless the cursor passed over the exact corner between the fourth tile of the second row and the one shown under the cursor in FIG. 2.3, it must have passed over either the fourth tile in the first row or the third tile in the second row. But since this took less than three quarters of a second, the tile passed over was not changed. In other words, there is a three quarter second grace period between the cursor entering a tile and that tile's cycling. This allows the operator to move the cursor freely around the screen without changing anything, provided the speed of movement is fast enough.

In FIG. 2.5, the cursor has been over the third tile in the first row for three quarters of a second, so the tile cycles to image B. In FIG. 2.6, another three quarters of a second cause it to cycle to image B. In FIG. 2.7, another three quarters seconds brings us back to image C. In FIG. 2.8, the cursor is moved to the second tile of the second row. After three quarters of a second there, that tile is cycled to image A in FIG. 2.9. The operator now clicks on that tile in FIG. 2.10. In FIG. 2.11 the expansion has started, expanding one level every half second. Additionally, in FIG. 2.11 it has been three quarters of a second since the last change of the tile in 2.9, so the tile under the cursor changes to B. Finally, in 2.12, another half second has passed so the expansion continues, but not enough time has passed for the image to change to C.

Operation—Dual View Screens

FIG. 3 shows how the display space can accommodate multiple view screens. In these figures, the display space covers a range wider than both view screens combined. It begins 20 units to the left of the view screen pictured on the left and ends at the right edge of the view screen on the right. There is an unviewed range 20 units wide separating the two view screens, but in FIGS. 3.1–3.12, this unseen area is shown to clarify the changes taking place.

In FIG. 3.1, at time 0, image C covers both view screens. Throughout the series from 3.1 to 3.12, the cursors are kept in the same locations. In FIG. 3.2, the tiles under the cursors both change to image A. In FIG. 3.3, the operator on the left clicks the tile under the cursor, but there is no immediate change other than the temporary cursor change to indicate that the click was made. In FIG. 3.4, the tiles both change to image B since three quarters of a second has elapsed since the previous change.

In FIG. 3.5, exactly one half second after the click, the clicked tile at the left "spreads" the A image out to the adjoining tiles. Note that the tile itself is no longer A, having cycled to B, but the click was on an A tile so that is the image which spreads. At the same time on the right, the operator clicks on the tile under cursor. As above, there is no immediate change other than a temporary cursor change.

In FIG. 3.6, image A spreads on the left and image B spreads on the right, since it has been a half second since the previous spread on the left and the click on the right. Both tiles under the cursor also change to image C since it has been three quarters of a second since the last change.

The spreading continues in FIG. 3.7. A has now filled the entire left view screen and the region of the display space between the view screens. Image B has spread on the right throughout the view screen on the right, and because this display space was designed to "wrap" horizontally, B has spread beyond the rightmost edge of the display space and into the leftmost tiles. In FIG. 3.8, the tiles under the cursors change to image A, since it has been three quarters of a second, but no spreading happens since it has only been a quarter second since the last spreading.

In FIG. 3.9, A tries to spread but is overrun by the spreading of B which overwrites it, having started more recently. In FIG. 3.10, the tiles change to B as the cursors remain unmoved, and the spreading of B continues. Note that in this figure B has spread into the left view screen from the left. In FIG. 3.11, B has spread through the region between the view screens and into the right edge of the left view screen. The spreading of B even changes the tile under the cursor on the left.

In FIG. 3.12, the tile under the cursor on the right changes since it has been three quarters of a second. However, the tile under the cursor in the left does not change, since it was more recently changed by the spreading of B, and it has only been a quarter second since that change.

Client-Server Implementation

Multiple input stations can be implemented with a client server model. The server maintains the display space, and the clients communicate their cursor positions and clicks and button presses. In this discussion, one client per input device and per view screen is assumed, but clearly other arrangements would be possible given appropriate hardware and/or software. For example, by adding additional video cards and monitors, it is quite common to have multiple view screens attached to the same computer. With just one input station and view screen, the discussion of clients and servers is still valid; both roles can be efficiently performed on the same box.

Client

The clients must continually inform the server exactly where in the display space their cursors are located. Since the view screens can overlap, and since it is desirable to display the other cursors, the server must also return to the client the location of the other cursors. The client then displays those cursors as different in shape or color so that the operator is not confused about which cursor is under his or her control. This is illustrated to some extent in FIG. 3. The right and left view screens display cursors which have been flipped horizontally, so that if the view screens overlapped (which they don't in these figures), the cursors would be distinct.

The clients must also inform the server whenever a tile is clicked or when a button is pressed. The server needs to return this information along with the cursor locations to the other clients on each cursor location update so that those clients can visually indicate clicks and button presses by temporarily swapping the shape of that cursor as was done in FIGS. 2 and 3 or by some other means such as providing audio feedback.

In addition to moving the cursors around on the screen, the clients poll the server periodically to find out what to draw and then draw it. They send the server the bounds of their view screen, and the server returns a list which indicates which image is tied to each tile displayed. A simple way for this to be done is for the server to return an array of image numbers, where each array entry corresponds to a tile. For example, in FIG. 3.11, the left view screen corresponds to the array [1, 1, 1, 2, 1, 1, 1, 2, 1, 1, 1, 2], where the number 1 is for image A and the number 2 represents image B. The client then uses the image number to select the image and associated function with which to draw the sub-region of its screen corresponding to each tile.

To summarize, the client has three basic tasks. First, as often as possible, it tells the server the cursor location and updates the cursor locations on the view screen, indicating clicks and button presses when necessary. Second, it informs the server about any of its own clicks or button presses. And finally, periodically it asks the server for the images tied to the tiles it is currently displaying and then draws its view screen accordingly.

Server

The server must maintain several data structures to facilitate answering the clients requests. Since multiple cursors can appear on the same view screen, the server must maintain the locations of all the cursors and their click information. A simple way to do this is to maintain the following data per client:

1. cursor location
2. time of last cursor location update
3. tile under cursor
4. image under cursor
5. time at which cursor entered tile with current image 6. time of last click
7. location of last click
8. the image last clicked on
9. time of last button press
10. location of cursor at time of last button press
11. image associated with last button pressed.

When a client supplies cursor location data, the server records the location and the time and checks whether the tile and or image under the cursor has changed. If so, it updates the time that at which the cursor entered the tile with current image. Then the server returns the following:

1. The locations of all cursors that have changed since this clients last update.
2. The location and image clicked on of all clients for which this click came after this client's last location update.
3. The location and image associated with the button of all clients for which this button press came after this client's last location update.

Whenever the server learns of a click, or key press, it must create a spreader and append it to its list of active spreaders. The spreader is a "closure" which is defined here to be an association of an algorithm with some data. In this case the algorithm is the spreading algorithm and the data includes the time of instantiation, the location of the tile clicked on, and the image clicked or image associated with the button. In FIGS. 2 and 3, the algorithm used was one of expanding a square of tiles around the tile clicked, but other algorithms would be possible. Having the tiles spiral out might be interesting. A checkerboard pattern could even be used instead of an even spread.

The server also maintains an array which gives the images tied to each tile. In FIG. 3.1, if the number 3 represents image C, then the array would have 12×3=36 entries, each of which would be 3. On a periodic basis, the server updates this array. First it calls each of the spreaders, in order, passing it the current time and a reference to the array. The spreader then changes the appropriate values in the array, usually resulting in more tiles tied to the spreader's image. The server now checks whether the images tied the tiles under any of the cursors have changed, and if so, updates the time at which those cursors entered the tile and image to the current time. Next, the server checks the amount of time each cursor has spent on its current tile. In those cases where the time is greater than a prescribed amount (three quarters second in FIGS. 2 and 3), it cycles those tiles by changing their array entries.

Now when the clients ask the server for the tiles given their view coordinates, the server can just return a sub-array of the main array it keeps for its display space, and the clients can then use the functions associated with the images to draw their screens.

Spreader lifetimes

For efficiency reasons, the server needs to limit the size of the spreaders list. This can be done by checking the return value of the calls to the spreaders and then removing those spreaders who request it by returning a designated value when they are called. In such a scheme the spreader could detect when it has reached the limits of the display space or has been clobbered by other spreaders by monitoring the current and previous states of the tiles at its boundaries. Alternatively, the number of spreaders can be limited to a fixed number, and when new spreaders come in which would put the count over the limit, the first one in the list is deleted. Yet another alternative is for the server to allow the spreaders only to run for a fixed number of updates.

For performance reasons, it may be preferable for the clients to store all the images locally, at least when those images are known ahead of time. However, for dynamic images or video streams which are maintained by the server, the client will need to retrieve the actual image data from the server. In this case, it is more efficient to serve these on demand to the clients since at any moment the client is likely to need only some fraction of the total stream.

Scrolling

It is interesting to allow the view screens to change position over time in the display space. In FIGS. 1, 2, and 3, the images were drawn to repeat so that they could be scrolled horizontally continuously. In this case, it would make sense to allow the view screens unlimited horizontal repositioning, either by having them scroll continuously or allowing the operators to manipulate them.

In the presence of scrolling, the mapping functions can provide added interest. If some image mapping functions map from the display space, the tiles tied to those images will scroll with the view screen. On the other hand, if an image mapping function maps from the points on the view screens, then the scrolling will not affect the image. In the former case, the tiles will scroll across the screen. In the latter case, the tiles will become windows which will scroll across the screen, revealing different parts of the underlying image. The juxtaposition of these two types of mapping functions can create an interesting visual environment.

Scope

Although the description above contains many specificities, these should not be construed as limiting the scope of the invention but merely providing illustrations of some of the presently preferred embodiments of the invention.

Thus the scope of the invention should be determined by the appended claims and their legal equivalents, rather than by the examples given.

I claim:

1. Method for displaying a set of images and movies on a graphics display device, said method comprising the following steps:

a. providing a display space divided up into a grid of tiles each of which are a small fraction of the display space;

b. providing one or more view screens which show sub-regions of the display space, with each view screen being large enough to display at least several tiles;

c. associating with each image a function which either maps each point in the display space to a point of the image or maps each point in every view screen to a point of the image;

d. providing one or more "spreading" functions which are functions which over time tend to increase the number of tiles tied to a particular image;

e. providing a list of active "spreaders" which are closures containing a spreading function and data including a starting location in the display space, a particular image, and a time of origination;

f. providing one or more input station each of which has a pointing device and associating with each pointing device a cursor which display that cursor on at least one view screen;

g. monitoring the position of each cursor and changing the image tied to the tile to another image in the set whenever the cursor has been over the same tile and image for a predefined amount of time;

h. responding to each click on a tile by creating a "spreader" closure by associating a spreading function with the location of the tile clicked, the image clicked on, and the time of the click and putting that closure into a list of active "spreaders";

i. calling each "spreader" functions in the list of active "spreaders" at a predetermined rate;

j. drawing the images onto the view screen whenever there is a change by determining which tiles correspond to the sub-region of the display space shown on the view screen and then determining which image is associated with each tile and then using the function associated with that image to determine which points of the image get displayed for each point of the display space contained in the tile.

2. The method of claim 1 additionally comprising the steps of:

a. providing one or more sets of input buttons;

b. associating each button with a particular image in the set;

c. responding to each button press as if the tile under the cursor was tied to the image associated with the button and as if the operator had clicked on that tile.

3. The method of claim 1 additionally comprising the steps of providing scrolling controls for the view screens.

4. The method of claim 1 additionally comprising the steps of continuously scrolling the view screens.

5. The method of claim 4 additionally comprising the steps of making the continuous scrolling be either horizontal or vertical thereby wrapping the display space around a cylinder and allowing the view screens to straddle the wrapping of the end of the space and the beginning.

6. The method of claim 1 additionally comprising the steps of removing spreaders from the active spreaders list based on elapsed time, total number of spreaders, or based on the results of the last call to the spreader.

* * * * *